(12) United States Patent
Lips

(10) Patent No.: US 12,352,335 B2
(45) Date of Patent: Jul. 8, 2025

(54) PLANETARY GEAR SET WITH UNEVENLY DISTRIBUTED PLANETARY GEARS

(71) Applicant: ZF FRIEDRICHSHAFEN AG, Friedrichshafen (DE)

(72) Inventor: Burkhard Lips, Witten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 5 days.

(21) Appl. No.: 18/712,723

(22) PCT Filed: Nov. 7, 2022

(86) PCT No.: PCT/EP2022/080950
§ 371 (c)(1),
(2) Date: May 23, 2024

(87) PCT Pub. No.: WO2023/104407
PCT Pub. Date: Jun. 15, 2023

(65) Prior Publication Data
US 2025/0020188 A1 Jan. 16, 2025

(30) Foreign Application Priority Data
Dec. 7, 2021 (DE) ...................... 10 2021 213 858.6

(51) Int. Cl.
*F16H 1/28* (2006.01)
(52) U.S. Cl.
CPC ...................... *F16H 1/28* (2013.01)
(58) Field of Classification Search
CPC ........................................................ F16H 1/28
See application file for complete search history.

(56) References Cited

U.S. PATENT DOCUMENTS

| 1,644,222 A | 10/1927 | Baker | |
|---|---|---|---|
| 2002/0091030 A1* | 7/2002 | Haga | F16H 1/2836 475/163 |
| 2008/0103016 A1* | 5/2008 | Nagy | F16H 1/28 475/331 |

(Continued)

FOREIGN PATENT DOCUMENTS

| AT | 509468 B1 * | 9/2011 | ............... F16H 1/28 |
|---|---|---|---|
| CN | 101890637 A | 11/2010 | |

(Continued)

OTHER PUBLICATIONS

Machine translation of DE 102015009070 A1 (Year: 2017).*

(Continued)

*Primary Examiner* — Farhana Pervin
(74) *Attorney, Agent, or Firm* — LEYDIG, VOIT & MAYER, LTD.

(57) ABSTRACT

A planetary gearbox, including N planet gears, a sun gear with $z_S$ teeth, and a ring gear with $z_H$ teeth. Axes of rotation of two of the N planet gears are arranged offset relative to a center axis of the sun gear by an angle φ' determined according to the following equation:

$$\varphi' = \frac{360°}{N}\left(1 + \frac{N-1}{z_H - z_S}\right).$$

2 Claims, 1 Drawing Sheet

(56) References Cited

U.S. PATENT DOCUMENTS

2010/0163261 A1* 7/2010 Tomayko ............... B25D 16/00
173/217
2019/0186598 A1* 6/2019 Fisher ................... F16C 19/361

FOREIGN PATENT DOCUMENTS

| CN | 111022623 B | 12/2020 |
|---|---|---|
| DE | 102009002788 A1 | 11/2010 |
| DE | 102015009070 A1 | 1/2017 |
| DE | 102017203214 A1 | 8/2018 |
| DE | 102019123326 A1 | 3/2021 |
| EP | 1347202 A2 | 9/2003 |

OTHER PUBLICATIONS

Müller, The Transmission: Interpretation and Versatile Applications, Constructive Tips for Planetary Gears, Dec. 1998, pp. 236-240, vol. 5, Springer, Berlin Heidelberg, Germany. ISBN 978-3-642-63698-1.

* cited by examiner

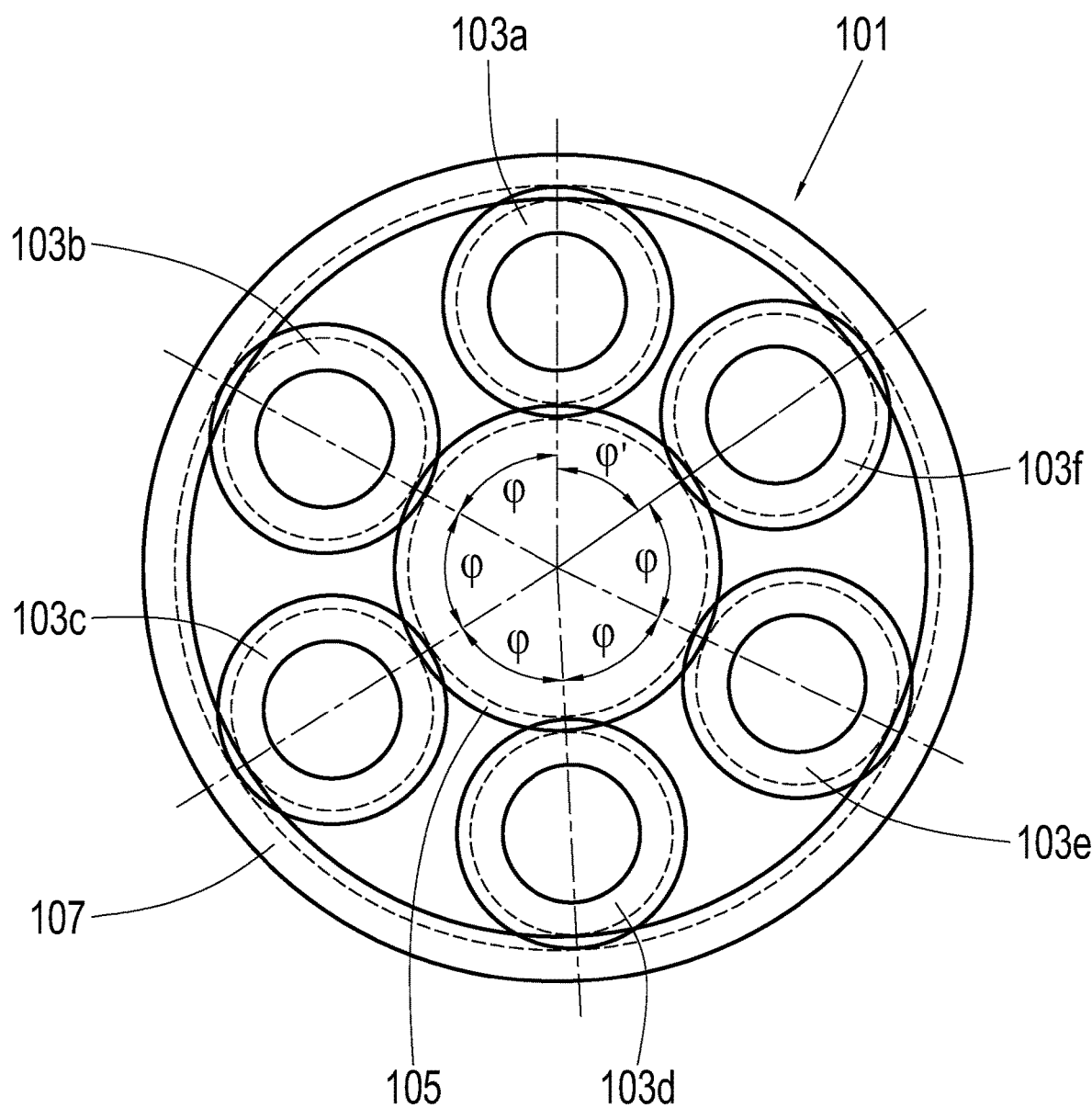

PLANETARY GEAR SET WITH UNEVENLY DISTRIBUTED PLANETARY GEARS

CROSS REFERENCE TO RELATED APPLICATIONS

This application is a U.S. National Phase application under 35 U.S.C. § 371 of International Application No. PCT/EP2022/080950, filed on Nov. 7, 2022, and claims benefit to German Patent Application No. DE 10 2021 213 858.6, filed on Dec. 7, 2021. The International Application was published in German on Jun. 15, 2023 as WO 2023/104407 A1 under PCT Article 21(2).

FIELD

The invention relates to a planetary gearbox and a type series.

BACKGROUND

A wide range of variants leads to high costs. One way to reduce the number of variants is to cover different load cases with the same gearbox. Thereby the gearbox must be dimensioned such that it can withstand the load case with the highest occurring loads. For the other load cases, this results in oversizing. Although the variant costs decrease, the component costs increase due to the oversizing.

One solution is to configure the number of planet gears in a planetary gearbox to be variable and to adapt it to the respective load case. However, this is only possible to a very limited extent, as the number of planet gears depends on the number of teeth on the sun gear and the number of teeth on the ring gear.

DE 10 2015 009 070 A1 discloses a planetary gearbox whose planet gears are unevenly spaced from one another in the circumferential direction of an axis of rotation of the sun gear. This ensures that the toothings of the planet gears transition from the single meshing region to the double meshing region at different times. As a result, the noise emissions resulting from the transition from the single meshing region to the double meshing region are reduced.

SUMMARY

A planetary gearbox, comprising N planet gears, a sun gear with $z_S$ teeth, and a ring gear with $z_H$ teeth. Axes of rotation of two of the N planet gears are arranged offset relative to a center axis of the sun gear by an angle $\varphi'$ determined according to the following equation:

$$\varphi' = \frac{360°}{N}\left(1 + \frac{N-1}{z_H - z_S}\right).$$

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a planetary gearbox.

DETAILED DESCRIPTION

In an embodiment, the present invention reduces the variant costs of planetary gearboxes.

The planetary gearbox according to an embodiment of the invention has N planet gears $P_1 \ldots P_N$, a sun gear and a ring gear. The number N of planet gears is at least two. In particular N can be greater than two. The values for N can be any natural number, for example 2, 3, 4, 5, 6, 7, 8, 9, 10, or a higher number.

The sun gear is externally toothed. The number $z_S$ of teeth on the sun gear is therefore positive.

The ring gear, on the other hand, has an internal toothing. Its number of teeth $z_H$ is specified with a negative value by definition.

In a planetary gearbox, the ring gear and the sun gear are arranged coaxially to each other, i.e. they have a common center and/or rotation axis. The planet gears are rotatably mounted in a planet carrier and mesh with the ring gear and/or the sun gear. Preferably, each planet gear meshes with the ring gear and the sun gear. The axes of rotation of the planet gears are aligned parallel to each other.

Two of the three components—ring gear, planet carrier and sun gear—are rotatably mounted. The corresponding axes of rotation preferably run parallel to each other. Preferably, the axes of rotation of the planet gears also run parallel to each other. The third component is non-rotatably fixed. In particular, the planet carrier and the sun gear can be rotatably mounted, while the ring gear is non-rotatably fixed, for example in a gearbox housing.

An embodiment of the invention is based on the idea of abandoning the usual uniform distribution of the planet gears in order to be able to cover more load cases with constructionally identical components. For this purpose, the N planet gears $P_1 \ldots P_N$ are arranged one after the other at the same distance to their respective predecessors. In detail, the planet gears $P_i$ for $i=2 \ldots N$, are each arranged at the same distance p to the respective predecessor. This results in a different distance $\varphi'$ between the planet gears $P_1$ and $P_N$. The following applies $\varphi \neq \varphi' = \varphi - \delta$, with a non-zero deviation $\delta$ between $\varphi$ and $\varphi'$.

As a measure of the distance between a first and a second planet gear is, for example, an angle is suitable by which an axis of rotation of the first planet gear and an axis of rotation of the second planet gear are offset relative to the center and/or rotation axis of the sun gear. This angle is identical to a torsion angle, also known as dihedral angle, between a surface spanning the axis of rotation of the first planet gear and the center and/or axis of rotation of the sun gear and a surface spanning the axis of rotation of the second planet gear and the center and/or axis of rotation of the sun gear. The torsion angle corresponds to an angle that is formed by two rays that extend in a cross-section from the center and/or axis of rotation of the sun gear through a respective axis of rotation of one of the two planet gears.

According to an embodiment of the invention the following applies:

$$\delta = \frac{360°}{-z_S \cdot (i_0 - 1)}.$$

Therein $i_0$ refers to the stationary gear ratio of the planetary gearbox, i.e.

$$i_0 = \frac{z_H}{z_S}.$$

The sum of all torsion angles in the planetary gearbox is 360°. Therefore the following applies:

$$360° = (N-1) \cdot \varphi + \varphi' = (1-N) \cdot \varphi + \varphi + \frac{360°}{z_S \cdot \left(\frac{z_H}{z_S} - 1\right)} = N \cdot \varphi + \frac{360°}{z_H - z_S}.$$

This results in $$\varphi = \frac{360°}{N} \cdot \left(1 - \frac{1}{z_H - z_S}\right) \text{ and } \varphi' = \frac{360°}{N} \cdot \left(1 + \frac{N-1}{z_H - z_S}\right).$$

A type series defines a number of individual devices. These form the type series. The type series is therefore identical to an arrangement consisting of the individual devices.

The devices of a type series according to an embodiment of the invention are planetary gearboxes.

The planetary gearboxes of the type series according to an embodiment of the invention have constructionally identical ring gears, constructionally identical sun gears and constructionally identical planet gears. The ring gears of two planetary gearboxes of the type series are therefore constructionally identical. The sun gears of two planetary gearboxes of the type series are also constructionally identical. Two planet gears of each planetary gearbox of the type series are also constructionally identical. Furthermore, the planet gears of each planetary gearbox are preferably constructionally identical relative to each other. This means that two planet gears of different planetary gearboxes of the type series are constructionally identical.

Two means or arrangements of means are constructionally identical if they match in their technical features and physical parameters—in particular with regard to their material and geometric properties—within the scope of the occurring manufacturing tolerances.

The planetary gearboxes of the type series according to an embodiment of the invention are characterized in that the numbers of their planet gears are at least partially different. This means that at least two planetary gearboxes of the type series have different numbers of planet gears.

An embodiment of the invention provides that at least one planetary gearbox of the type series is configured as described at the beginning. A further planetary gearbox of the type series preferably has a conventional configuration. A conventional planetary gearbox is characterized by the fact that $$\delta = 0 \text{ and thus } \varphi = \varphi' = \frac{360°}{N}.$$

The type series according to an embodiment of the invention makes it possible to precisely adapt each planetary gearbox contained in it to the expected loads. This is done by varying the number of planet gears. An oversizing of individual planetary gearboxes can thus be avoided. Furthermore, variant costs can be saved by using constructionally identical components across all gearboxes.

The planetary gearbox 101 shown in FIG. 1 has a first planet gear 103a, a second planet gear 103b, a third planet gear 103c, a fourth planet gear 103d, a fifth planet gear 103e, a sixth planet gear 103f, a sun gear 105 and a ring gear 107. The planet gears 103a, 103b, 103c, 103d, 103e, 103f each mesh with the sun gear 105 and the ring gear 107.

The second planet gear 103b is arranged offset relative to the first planet gear 103a, the third planet gear 103c relative to the second planet gear 103b, the fourth planet gear 103d relative to the third planet gear 103c, the fifth planet gear 103e relative to the fourth planet gear 103d and the sixth planet gear 103f relative to the fifth planet gear 103e, each by an angle $\varphi$. The first planet gear 103a is arranged offset relative to the sixth planet gear 103f by an angle $\varphi'$. The angle $\varphi'$ differs from the angle $\varphi$.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 planetary gearbox
103a first planet gear
103b second planet gear
103c third planet gear
103d fourth planet gear
103e fifth planet gear
103f sixth planet gear
105 sun gear
107 ring gear

The invention claimed is:

1. A planetary gearbox, comprising:
N planet gears;
a sun gear with $z_S$ teeth; and
a ring gear with $z_H$ teeth,
wherein axes of rotation of two of the N planet gears are arranged offset relative to a center axis of the sun gear by an angle $\varphi'$ determined according to the following equation:

$$\varphi' = \frac{360°}{N}\left(1 + \frac{N-1}{z_H - z_S}\right).$$

2. A type series of planetary gearboxes, comprising:
constructionally identical planet gears;
constructionally identical sun gears; and
constructionally identical ring gears,
wherein each planetary gearbox has a different number of the planet gears, and
wherein at least one of the planetary gearboxes is configured as the planetary gearbox according to claim 1.

\* \* \* \* \*